United States Patent [19]

Dearman

[11] Patent Number: 5,174,769
[45] Date of Patent: Dec. 29, 1992

[54] COUPLING FOR BRAIDED CABLE

[75] Inventor: Kenneth W. J. Dearman, Slough, England

[73] Assignee: Smiths Industries Public Limited Company, London, England

[21] Appl. No.: 875,837

[22] Filed: Apr. 30, 1992

[30] Foreign Application Priority Data

May 22, 1991 [GB] United Kingdom ............... 9111040

[51] Int. Cl.⁵ .......................................... H01R 13/648
[52] U.S. Cl. .................................. 439/98; 174/75 C; 439/583
[58] Field of Search ................... 439/98, 99, 583, 584, 439/610; 174/75 C, 88 C

[56] References Cited

FOREIGN PATENT DOCUMENTS 1603523 11/1981 United Kingdom .
875513 10/1981 U.S.S.R. ............................. 439/98

Primary Examiner—Gary F. Paumen
Attorney, Agent, or Firm—Pollock, VandeSande and Priddy

[57] ABSTRACT

A coupling for one end of screened conduit has two brass cones which are nested together and through which extend screened cables. Several apertures are formed around the inner cone which open into the space between the two cones. The braiding of each cable is stripped to one side and threaded through individual apertures so that it extends into the space between the cones. A threaded clamping nut urges the two cones together so that the braiding is clamped between them and good electrical connection is made.

9 Claims, 1 Drawing Sheet

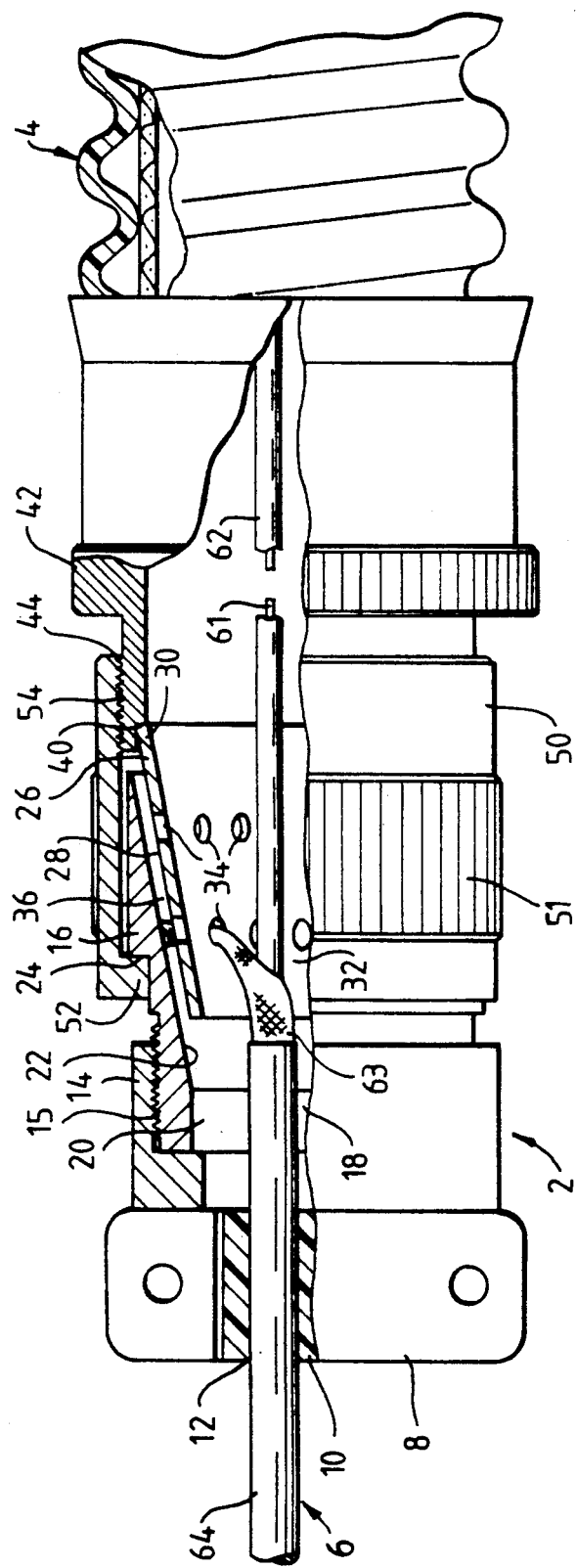

COUPLING FOR BRAIDED CABLE

BACKGROUND OF THE INVENTION

This invention relates to couplings for braided cables.

It is often necessary to make a coupling to a braided cable such as in a connector, bulkhead termination or at an entry to a conduit. The usual way in which the electrical connection to the screening braid is achieved is to strip off the braid and to clamp it between two nested metal conical ferrules through which the cable extends. A coupling nut is screwed about the two ferrules forcing them together axially so that a high clamping force is exerted on the braiding. This arrangement can produce an effective electrical connection with the braid without the need for soldering. The problem, however, with couplings of this kind is that, where the coupling has several cables extending within it, the braiding of the different cables becomes spread and tangled when the two ferrules are forced together. This makes it difficult to remove an individual cable without disturbing the remaining cables. As a consequence, repair and maintenance of these multi-cable couplings can be difficult and time consuming. It can also lead to damage to the braiding.

BRIEF SUMMARY OF THE INVENTION

It is an object of the present invention to provide a coupling which can be used to avoid these disadvantages.

According to one aspect of the present invention, there is provided a coupling for braided cable, the coupling including an inner member of electrically-conductive material having a tapering external surface, an outer member of electrically-conductive material having a tapering internal surface, the tapering surfaces on the inner and outer members being arranged to be drawn towards one another, and one of the members having at least one aperture therethrough through which braiding of the cable can extend into a space between the two tapering surfaces.

The inner and outer members are preferably of conical shape with the external surface of the inner member extending substantially parallel to the internal surface of the external member. The or each aperture preferably extends through the inner member. A plurality of apertures may extend in a first ring around the inner member and a plurality of apertures may extend in a second ring around the inner member, the second ring of apertures being displaced from the first ring of apertures along the inner member. The coupling may include a clamping member arranged to draw the tapering surfaces on the inner and outer members towards one another. The clamping member may be a screw-threaded nut which draws the tapering surfaces together when it is tightened. One end of the coupling may be attached to an electrically-screened conduit. The coupling may include a strain relief clamp which clamps onto the or each cable extending through the coupling. The coupling may include a plurality of cables and a plurality of apertures, one for each of the cables.

A coupling in accordance with the present invention will now be described, by way of example, with reference to the accompanying drawing.

BRIEF DESCRIPTION OF THE DRAWING

The accompanying drawing is a sectional side elevation view of the coupling on a conduit.

The coupling 2 forms the termination of an electrically-screened conduit 4 within which extend fifty cables, only one of which 6 is shown, for simplicity. Each cable 6 comprises an inner wire core 61 surrounded by an insulating plastics sheath 62. A screening 63 of braided copper wire extends around the sheath 62 along a part of the length of the cables. The braided screening 63 is encased in an insulating plastics jacket 64.

The coupling 2 has, at its left-hand end, a conventional strain relief clamp 8 of tubular shape which has an elastomeric insert 10 with passages 12 through which extend the individual cables 6. The insert 10 can be compressed about the jacket 64 of the cables 6 so that they are clamped in position. Different forms of strain relief clamp could be used, such as those in which all the cables extend through a common passage. The jacket 64 of each cable 6 is stripped off approximately level with the right-hand end of the clamp 8 so that the braid 63 is exposed to the right of this point. The right-hand end of the clamp 8 has an internally screw-threaded collar 14 which is screwed onto an external thread 15 at the left-hand end of an outer cone or ferrule 16 of a metal, such as brass. The internal bore 18 through the ferrule 16 has at its left-hand end a short parallel section 20. To the right of this extends a section 22 with a conical tapering surface which increases in diameter towards its right-hand end. The outer ferrule 16 is of circular section and has an annular shoulder 24 on its external surface, about half way along its length.

Nested within the outer ferrule 16 is an inner cone or ferrule 26 of metal, such as brass, which has an external conical surface 28 parallel to the tapered section 22 on the outer ferrule 16 and which similarly tapers to an increasing diameter at its right-hand end 30. The internal surface 32 of the inner ferrule 26 is tapered parallel to its external surface 28, the cone being of circular section. The inner ferrule 26 has several circular apertures 34 through its wall which are each large enough to receive braiding 63 stripped from one of the cables 6. A ring of twenty apertures 34 extends around the ferrule 26 about one third of the distance from its left-hand end; a similar ring of thirty apertures 34 extends around the inner ferrule about two thirds of the distance from its left-hand end. The braiding 63 of each cable 6 extends away from the underlying sheath 62 through a respective one of the apertures 34 and into the annular space 36 between the two ferrules 16 and 26.

The right-hand end 30 of the inner ferrule 26 projects from the right-hand end of the outer ferrule 16 by a short distance and seats within a neck 40 at the left-hand end of a mating adaptor 42. The adaptor 42 is joined to the left-hand end of the conduit 4 and takes the form of a tubular metal shell having an external screw thread 44 around its left-hand end.

The coupling 2 is completed by a clamping nut 50 of cylindrical shape and with an external knurled surface 51. The nut 50 embraces the right-hand end of the outer ferrule 16 and the left-hand end of the mating adaptor 42. At its left-hand end, the nut 50 has an internal shoulder 52 which engages the shoulder 24 on the outer ferrule 16. At its right-hand end, the nut 50 has an internal screw thread 54 which engages the screw thread 44 on the adaptor 42. The nut 50 is rotatable about the coupling 2 so as vary the distance between the outer ferrule 1 and the mating adaptor 42 and hence to vary how far the inner ferrule 26 projects within the outer ferrule 16. In this way, the spacing can be altered between the facing tapering surfaces 28 and 22 on the two ferrules 16 and 26.

The coupling 2 is assembled by first stripping off the jacket 6 from the right-hand end of each cable 6 to expose the braid 63, pulling the braid to one side and trimming to leave about 5 cm of loose braid. Each cable 6 is then threaded through the strain relief clamp 8, the outer ferrule 16 and the clamping nut 50 in their disassembled state. The cables 6 are then threaded into the conduit 4 so that their exposed braids 63 are located within the inner ferrule 26. The braids 63 are then threaded through respective ones of the apertures 34 so that their ends lie on the external surface 28 of the inner ferrule 26. This may be done by inserting a hook through each aperture 34, looping this under a braid 63 and pulling the hook and braid out through the aperture. When all fifty of the braids 63 have been pulled through the apertures 34, they are trimmed in length so that about 5 mm of braid projects on the external surface 28 of the inner ferrule 26. The braids 63 are then bent flat against the surface of the inner ferrule 26 and the outer ferrule 16 is pushed to the right over the inner ferrule so as to trap the ends of the braid. The clamping nut 50 is then rotated so that the outer ferrule 16 is moved further along the inner ferrule 26, bringing the internal surface 22 of the outer ferrule and the external surface 28 of the inner ferrule closer together. This causes the braiding 63 of each cable 6 to spread as the clamping force is increased. Because, however, the braiding 63 of each cable 6 is located in a separate aperture 34, there is only a low risk of the braiding of one cable becoming entangled with that of another cable. Any tangling that might occur is easily rectified during repair because the length of braid tangled can only be very short.

The coupling, therefore, has considerable advantage in multi-cable applications because it greatly facilitates removal of an individual cable. Less damage is caused to the delicate wires making up the braiding of the cables so the coupling maintains a high integrity of earthing. The coupling of the invention could be used with a single cable or with any other number of cables.

It will be appreciated that the coupling need not be used with a conduit, as described above. Alternatively, for example, one end of the coupling could be secured to a plate such as the wall of an electronics housing. In another example, the coupling could include electrical contact elements to which each cable is connected, the coupling being adapted to mate with another coupling having cooperating contact elements.

What I claim is:

1. In a coupling for braided cable including an inner member of electrically-conductive material having a tapering external surface, and an outer member of electrically-conductive material having a tapering internal surface, so that when the tapering surfaces on the inner and outer members are drawn towards one another braiding from the cable can be clamped in the space between the tapering surfaces on the inner and outer members, the improvement wherein one of said members has at least one aperture therethrough through which braiding of the cable can extend into the space between the two tapering surfaces.

2. A coupling according to claim 1, wherein the inner and outer members are of conical shape, and wherein the external surface of the inner member extends substantially parallel to the internal surface of the external member.

3. A coupling according to claim 1, wherein the or each aperture extends through the inner member.

4. A coupling according to claim 3, wherein a plurality of apertures extend in a first ring around the inner member and a plurality of apertures extend in a second ring around the inner member, and wherein the second ring of apertures is displaced from the first ring of apertures along the inner member.

5. A coupling according to claim 1, wherein the coupling includes a clamping member, and wherein the clamping member draws the tapering surfaces on the inner member and outer member towards one another.

6. A coupling according to claim 5, wherein the clamping member is a screw-threaded nut which draws the tapering surfaces together when it is tightened.

7. A coupling according to claim 1, wherein the coupling includes a strain relief clamp, and wherein the strain relief clamp clamps onto the cable extending through the coupling.

8. A coupling for a plurality of braided cables comprising: an outer conical member of metal; an inner conical member of metal nested within the outer member to form a space between the outer surface of the inner member and the inner surface of the outer member; a plurality of apertures through the inner member which open into the space between the members such that braiding from each cable can be led through a respective one of the apertures into the space; and a clamping member arranged to draw the inner and outer members together to clamp the braiding between the inner and outer members.

9. A coupling for making electrical connection of an electrical conduit to braiding on a plurality of braided cables extending through the conduit comprising: a first end secured to the electrical conduit; a second end opposite the first including a strain relief clamp clamped onto the cables; an outer conical member of metal; an inner conical member of metal nested within the outer member to form a space between the outer surface of the inner member and the inner surface of the outer member; a plurality of apertures through the inner member which open into the space between the members and through which braiding from respective cables extend into the space; and a clamping member that draws the inner and outer member together to clamp the braiding between the inner and outer members.

* * * * *